United States Patent [19]
Tominaga et al.

[11] Patent Number: 5,523,140
[45] Date of Patent: Jun. 4, 1996

[54] OPTICAL RECORDING METHOD AND MEDIUM

[75] Inventors: Junji Tominaga; Tokuhiko Handa; Susumu Haratani; Ryo Inaba, all of Nagano, Japan

[73] Assignee: TDK Corporation, Tokyo, Japan

[21] Appl. No.: 400,765

[22] Filed: Mar. 8, 1995

[30] Foreign Application Priority Data

Mar. 31, 1994 [JP] Japan ...................................... 6-87854

[51] Int. Cl.⁶ ...................................... B32B 3/00
[52] U.S. Cl. ....................... 428/64.1; 428/64.2; 428/64.4; 428/64.3; 428/913; 430/270.1; 430/270.11; 430/270.12; 430/270.13; 430/495.1; 430/945; 369/283; 369/288
[58] Field of Search .................................. 428/64.1, 64.2, 428/64.4, 64.5, 913; 369/283, 288; 430/270, 495, 945, 270.1, 270.11, 270.12, 270.13

[56] References Cited

U.S. PATENT DOCUMENTS 5,063,097  11/1991  Hirota ........................ 428/65
5,154,957  10/1992  Yamada ................... 428/64.1

FOREIGN PATENT DOCUMENTS 4-267192  9/1992  Japan .
6-60419A  1/1993  Japan .

*Primary Examiner*—Patrick J. Ryan
*Assistant Examiner*—Elizabeth Evans
*Attorney, Agent, or Firm*—Watson Cole Stevens Davis

[57] ABSTRACT

A phase change type optical recording medium has a recording layer of a recording material containing elements A, B, and C wherein A is Ag and/or Au, B is Sb and/or Bi, and C is Te and/or Se. Information is recorded by directing a light beam to the recording layer to form recorded marks therein such that the recorded marks are amorphous or microcrystalline while an unrecorded portion of the recording layer remains crystalline, and the A concentration of the unrecorded portion is at least 0.5 atom % higher than the A concentration of the recorded marks. C/N and modulation factor are improved and such improvements are kept even after hot humid storage.

18 Claims, 1 Drawing Sheet

OPTICAL RECORDING METHOD AND MEDIUM

BACKGROUND OF THE INVENTION

1. Field of the Invention

This invention relates to an optical recording method of recording information in a recording layer by irradiating a light beam thereto to induce a crystallographic change and an optical recording medium used therein.

2. Prior Art

Highlight is recently focused on optical recording media capable of recording information at a high density and erasing the recorded information for rewriting. One typical rewritable optical recording medium is of phase change type wherein laser light is directed to the recording layer to change its crystallographic state whereby a change of reflectivity by such a crystallographic change is detected. Optical recording media of the phase change type are of great interest since they can be overwritten by a single light beam and operated by a drive unit with a relatively simple optical system as compared with magnetooptical recording media.

Most optical recording media of the phase change type used Ge—Te systems which provide a substantial difference in reflectivity between crystalline and amorphous states and have a relatively stable amorphous state. It was recently proposed to use new compounds known as chalcopyrites. Chalcopyrite type compounds were investigated as compound semiconductor materials and have been applied to solar batteries and the like. The chalcopyrite type compounds are composed of Ib-IIIb-VIb$_2$ or IIb-IVb-Vb$_2$ as expressed in terms of the Groups of the Periodic Table and have two stacked diamond structures. The structure of chalcopyrite type compounds can be readily determined by X-ray structural analysis and their basic characteristics are described, for example, in "Physics", Vol. 8, No. 8 (1987), pp. 441 and Electrochemistry, Vol. 56, No. 4 (1988), pp. 228.

Among the chalcopyrite type compounds, AgInTe$_2$ is known to be applicable as a recording material by diluting it with Sb or Bi. The resulting optical recording media are generally operated at a linear velocity of about 7 m/s. See Japanese Patent Application Kokai (JP-A) No. 240590/1991, 99884/1991, 82593/1991, 73384/1991, and 151286/1992.

In addition to these phase change type optical recording media using chalcopyrite type compounds, JP-A 267192/1992 and 232779/1992 disclose phase change type optical recording media wherein a recording layer crystallizes to create an AgSbTe$_2$ phase.

In the phase change type optical recording media, it is important that not only a C/N ratio and a modulation factor are excellent immediately after recording, but also they do not deteriorate during shelf storage. However, those phase change type optical recording media wherein recorded marks are amorphous or microcrystalline tend to deteriorate in C/N and modulation factor during high-temperature storage because the recorded marks gradually crystallize. It is thus desired to have more reliable such media.

SUMMARY OF THE INVENTION

Therefore, an object of the present invention is to provide a novel and improved method for recording information in an optical recording medium of the phase change type so as to achieve a satisfactory C/N ratio and modulation factor while minimizing losses thereof when the medium is stored at high temperatures. Another object of the present invention is to provide a novel and improved optical recording medium of the phase change type capable of such effective recording.

According to the present invention, there is provided a method for recording information in an optical recording medium having a recording layer by directing a light beam to the recording layer to form recorded marks therein. The recording layer is comprised of a recording material containing elements A, B, and C wherein A is at least one of silver (Ag) and gold (Au), B is at least one of antimony (Sb) and bismuth (Bi), and C is at least one of tellurium (Te) and selenium (Se). An unrecorded portion of the recording layer is crystalline. Recording is made so as to turn the recording material to be amorphous or microcrystalline for forming recorded marks. The unrecorded portion has a first concentration of A and the recorded marks have a second concentration of element A. A differential A concentration given by the first concentration minus the second concentration is at least 0.5 atom % and preferably, up to 5 atom %.

Preferably the medium is operated such that the recording layer may have a linear velocity of 1.0 to 6.0 m/s relative to the light beam.

In preferred embodiments, the recording material contains 3.0 to 28 atom % of element A; and the unrecorded portion contains an ABC$_2$ phase and further contains a B phase. The recording material may further contain indium (In) and the unrecorded portion contains an In-C phase. The recording material may further contain at least one element M selected from the group consisting of Ti, Zr, Hf, V, Nb, Ta, Fin, W, and Mo.

Preferably, the recording material is represented by the formula:

$A_aB_bC_cIn_dM_e$ wherein A, B, C and M are as defined above and letters a, b, c, d, and e representative of an atomic ratio are in the range:

3.0≦a23 13.0, 45.0≦b≦87.0, 8.0≦c≦34.0, 2.0≦d≦8.0,

0≦e≦5.0, and a+b+c+d+e=100.

Preferably, in the recording material, element A contains at least 50 atom % of silver; element B contains at least 50 atom % of antimony; and element C contains at least 0 atom % of tellurium.

Typically the recording layer is 100 to 500 Å thick.

Also contemplated herein is an optical recording medium for use in the optical recording method set forth above.

FUNCTION AND ADVANTAGES

In the phase change type optical recording medium, a recording layer is formed in an amorphous state as by sputtering. It is then heated and slowly cooled down, allowing a crystalline phase of, for example, AgSbTe$_2$ and AgInTe$_2$ to precipitate out. This is generally called initialization. On recording, a light beam is irradiated to the thus initialized recording layer to melt the irradiated spot. The molten spot is rapidly quenched upon removal of the light beam, forming an amorphous or microcrystalline recorded mark.

Such a phase change type optical recording medium deteriorates in C/N and modulation factor during storage under high-temperature conditions probably because the recorded marks which should remain amorphous or microcrystalline tend to gradually crystallize.

According to the invention, recording is done such that the A (Ag and/or Au) concentration of the recorded marks may be at least 0.5 atom % lower than the A concentration of the unrecorded portion. By forming recorded marks so as to establish such a differential A concentration, the amorphous or microcrystalline material of which the recorded marks are constructed becomes sufficiently stable to retard crystallization during high-temperature storage. As a result, losses of C/N and modulation factor are minimized. Recording to bring out such a differential A concentration also improves repetitive recording characteristics. Namely, any loss of C/N and modulation factor upon repetitive recording is minimized.

Though not bound to the theory, it is believed that a difference develops between the A concentration of the unrecorded portion and the A concentration of the recorded marks because element A diffuses along a heat transfer direction upon melting and quenching of the recording material. No substantial diffusion of A occurs upon erasing because recorded marks are erased by irradiating thereto an erasing light beam of a low power by which the recording material is not melted. However, that region which has been erased back to an unrecorded portion has an A concentration which does not remain as low as in the recorded mark, but is higher than in the recorded mark. This is probably because in forming a recorded mark by melting and quenching the recording material in proximity to an erased site, element A diffuses from the melt to the erased site.

According to the invention, the A content and thickness of the recording layer, the linear velocity of the medium during recording and other factors are preferably controlled such that the above-defined differential A concentration may be established at the end of recording.

None of the above-cited patent publications directed to phase change type optical recording media describe or suggest that the Ag concentration of recorded marks is lower than that of an unrecorded portion.

More particularly, JP-A 240590/1991 proposes an information recording medium having a recording layer comprising $(AgInTe2)_{1-a}M_a$ wherein M is Sb and/or Bi and $0.30 \leq a \leq 0.92$ as a main component and having a mixture of $AgInTe_2$ and M phases. The alleged advantages include improvements in laser writing sensitivity, erasing sensitivity, repetitive overwriting ability and erasing ratio. It is not described that the amorphous material of recorded marks has a reduced Ag concentration. Examples of JP-A 240590/1991 use a recording layer having a low Ag content like the preferred embodiment of the present invention. Exemplified are $(AgInTe_2)_{0.3}Sb_{0.7}$ (Ag7.5 atom %), $(AgInTe_2)_{0.1}Sb_{0.9}$ (Ag2.5 atom %), and $(AgInTe_2)_{0.05}Sb0.95$ (Ag 1.25 atom %). The recording layer is as thick as 1,000 Å and the linear velocity during recording is as high as 7 m/s. No reference is made to the development of $AgSbTe_2$, In—Te, and Sb phases after crystallization of the recording layer. All these factors are outside the preferred ranges of the present invention. For this reason, it is not presumed that in the Examples of JP-A 240590/1991 using a recording layer with a low Ag content, a differential Ag concentration develops at the end of recording.

JP-A 151286/1992 discloses an information recording medium using a recording material which contains microcrystalline $AgInTe_2$ after initialization or crystallization and also contains microcrystalline $AgInTe_2$ in recorded marks. It is not described that the recorded marks have a reduced Ag concentration. Example described therein uses a recording material having the composition: $(AgInTe_2)_{25}Sb_{75}$ (Ag6.25 atom %) and recording is at a linear velocity of 5.6 m/s. The recording layer in the Example is as thick as 1,000 Å. No reference is made to the development of $AgSbTe_2$, In—Te, and Sb phases.

JP-A 232779/1992 discloses an information recording medium including a recording layer which contains Ag, In, Te, and Sb in a specific ratio. It is not described that the amorphous material of recorded marks has a reduced Ag concentration. It is described that crystalline peaks attributable to $AgSbTe_2$ are observable in X-ray diffractometry of the recording layer. Examples described therein use recording layers having Ag contents of 10 atom % and 8 atom % while a comparative example has an Ag content of 4 atom %. However, the recording layer is as thick as 1,000 Å and the linear velocity during recording is as high as 7 m/s.

JP-A 267192/1992 discloses an information recording medium including a recording layer which contains Ag, Sb, and Te wherein the recording layer forms a uniform amorphous phase upon recording while a $AgSbTe_2$ phase separates and crystallizes upon erasing. It is not described that the recorded marks have a reduced Ag concentration. Example described therein uses a recording layer of $(AgSbTe_2)(In_{1.5}Sb_{3.5}Te)$ having an Ag content of 10 atom %. Recording is at a high linear velocity of 7 m/s. The recording layer is as thick as 1,000 Å.

JP-A 185733/1993 discloses an information recording medium including a recording layer containing Ag—In—Te—Sb. Example described therein uses a recording layer of $Ag_{10}In_{10}Te_{20}Sb_{60}$ which is as thick as 1,000 A. Recording is at a high linear velocity of 7 m/s.

DETAILED DESCRIPTION OF THE INVENTION

Figure 1:
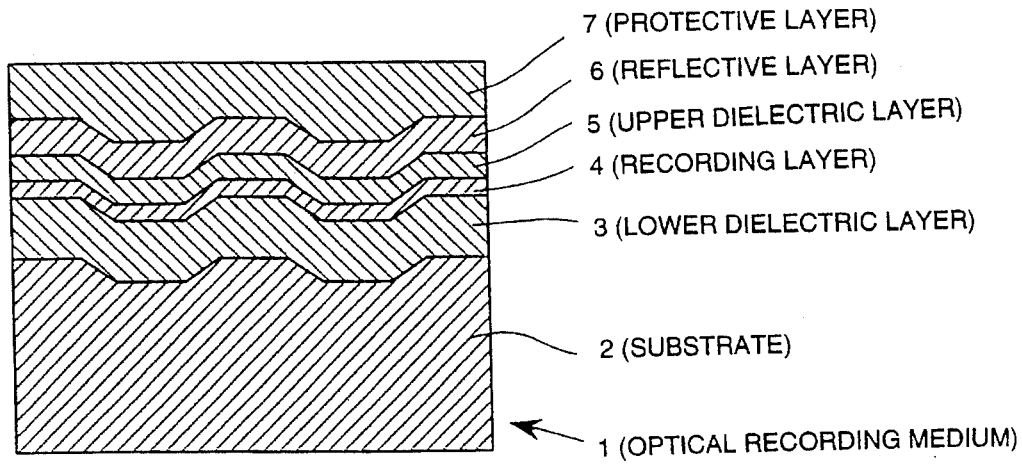
FIG. 1 is a fragmental cross-sectional view of an exemplary optical recording medium used in the invention.

The optical recording medium used in the present invention has on a substrate a recording layer comprised of a recording material containing elements A, B, and C wherein A is silver (Ag) and/or gold (Au), B is antimony (Sb) and/or bismuth (Bi), and C is tellurium (Te) and/or selenium (Se). Upon irradiation of a light beam to the recording layer, the recording layer changes its crystallographic state to form or erase recorded marks therein.

In the recording layer, the recorded marks are amorphous or microcrystalline while an unrecorded portion remains crystalline. According to the invention, recording is done such that the A concentration of the recorded marks may be lower than the A concentration of the unrecorded portion. The recorded marks are formed by irradiating a recording light beam to the recording layer to melt the recording material whereupon the irradiated or molten spot is quenched upon removal of the light beam. It is believed that a differential A concentration is developed between the unrecorded portion and the recorded marks because element A diffuses along a heat transfer direction upon melting and quenching of the recording material. The differential A concentration, that is, the A concentration of the unrecorded portion minus the A concentration of the recorded marks is at least 0.5 atom %, preferably at least 0.8 atom %. If the differential A concentration is below this limit, reliability is not fully improved and crystallization of recorded marks can occur during storage to bring out substantial losses of C/N and modulation factor. Preferably the differential A concentration is up to 5.0 atom %, especially up to 3.0 atom %. If the differential A concentration is above this limit, in a recorded mark crystallizing process associated with erasing, the recorded marks would crystallize into a state that their A concentration is not equal to that of the unrecorded portion. As a result, regions having a different crystal transition rate would be formed in the unrecorded portion. If signals are recorded again in the unrecorded portion in such a state at a low linear velocity, noise is increased, resulting in a C/N decline.

It is understood that the A concentration of unrecorded portions and recorded marks can be measured by electron probe microanalysis (EPMA) and X-ray microanalysis.

Preferably the recording material has an A content of up to 28.0 atom %, more preferably up to 13.0 atom %, further preferably up to 10 atom %, most preferably up to 9.0 atom %. If the recording material contains element A in an amount above this limit, element A would be saturated in the crystalline phase in the unrecorded portion, restraining element A from diffusing from the record mark-forming zone upon recording. It is then difficult to establish the differential A concentration defined above. The A content in the recording material should preferably be at least 3.0 atom %, more preferably at least 4.0 atom %. If the A content of the recording material s below this limit, it would be difficult to re-crystallize recorded marks and hence, to repeat overwriting.

Preferably the unrecorded portion contains an $ABC_2$ phase such as $AgSbTe_2$ phase as a crystalline phase. By selecting the composition of the recording material and recording parameters such that the unrecorded portion is mainly composed of the $ABC_2$ phase, the differential A concentration defined above can be readily established. Preferably, the unrecorded portion contains a B phase such as Sb phase in addition to the $ABC_2$ phase. The B phase is a crystalline phase. By selecting the composition of the recording material and recording parameters such that the unrecorded portion may further contain the B phase, the differential A concentration defined above can be readily established.

In one preferred embodiment, the recording material further contains indium (In). Indian bonds with element C and is present as an In—C phase such as In—Te phase in the unrecorded portion. The In—C phase is a crystalline phase consisting essentially of In and C, which is believed to have a ratio of In:C substantially equal to 1:1. By selecting the composition of the recording material and recording parameters such that the unrecorded portion may further contain the In—C phase, the differential A concentration defined above can be readily established. (Note that C used herein is Te and/or Se, but not a symbol for carbon.)

The presence of the above-mentioned phases can be acknowledged by transmission electron microscopy and EPMA.

Preferably the recording material further contains element M which is at least one element selected from the group consisting of titanium, zirconium, hafnium, vanadium, niobium, tantalum, manganese, tungsten, and molybdenum. It is believed that element M is effective for reducing the crystal transition rate (the rate at which an amorphous or microcrystalline material grows into coarse crystals) by restraining a change of an $ABC_2$ crystal structure. The reason of addition of element M is described below. When the linear velocity of the recording layer relative to a recording light beam is slow, the thermal influence of a light beam can flood over the irradiated spot. In a phase change type optical recording medium using a recording material of an Ag—Sb—Te system, the region heated by a light beam is quenched to convert into an amorphous or microcrystalline state whereby a signal is recorded. For signal recording areas of long wavelength signals such as 11T signals, a slow linear velocity allows a first irradiated spot to be sequentially slightly heated by the influence of an adjacent subsequently irradiated spot so that the first irradiated spot slowly cools down, resulting in an insufficiently amorphous or microcrystalline recorded mark. As a result, C/N and repetitive recording capability are lost. Since element M is effective for reducing the crystal transition rate by restraining crystal growth, it is easy to form amorphous or microcrystalline recorded marks even at a slow relative linear velocity. This ensures a good C/N and a high modulation factor as well as improved repetitive overwrite capability. Among elements M, titanium and vanadium, especially titanium, are more effective for reducing the crystal transition rate. Vanadium and titanium, especially vanadium, are also effective for improving reliability under deleterious conditions such as hot humid conditions. It is then preferred that one or both of titanium and vanadium, especially vanadium, occupies at least 80 atom %, especially 100 atom % of the entire M.

Specifically described, the invention prefers the use of a recording material of the composition:

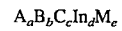

Herein, A, B, C and M are as defined above, and In is indium. Letters a, b, c, d, and e representative of an atomic ratio are in the following range, provided that a+b+c+d+e= 100.

| General | Preferred | More preferred |
|---|---|---|
| $3.0 \leq a \leq 13.0$ | $4.0 \leq a \leq 10.0$ | $4.0 \leq a \leq 9.0$ |
| $45.0 \leq b \leq 87.0$ | $54.0 \leq b \leq 82.0$ | |
| $8.0 \leq c \leq 34.0$ | $11.0 \leq c \leq 30.0$ | |
| $2.0 \leq d \leq 8.0$ | $3.0 \leq d \leq 6.0$ | |
| $0 \leq e \leq 5.0$ | $0.5 \leq e \leq 5.0$ | |

The reason of limitation of a is the same as the aforementioned reason of limitation of the A content.

If b is below the range, the proportion of B phase in the unrecorded portion would be low so that a differential reflectance concomitant with a phase change is increased, but a crystal transition rate is drastically slowed down to impede erasing. If b is beyond the range, a differential reflectance concomitant with a phase change would be reduced to provide a lower modulation factor and a crystal transition rate is accelerated to impede recording at a low linear velocity.

If c is below the range, the amount of C to form the $ABC_2$ phase would be short and the proportion of $ABC_2$ phase declines. In turn, A becomes excessive, forming A phase and undesirable phases other than $ABC_2$ phase. Then element A little diffuses from the recorded mark to the unrecorded portion during recording, or inversely, A diffuses into the recorded marks. Little reliability improvement is achieved or reliability is rather reduced. If c is beyond the range, element C would become excessive even after formation of $ABC_2$ and In—C phases, forming a C phase which lowers a crystal transition rate to impede erasing.

If d is below the range, the proportion of In—C phase would decrease and the proportion of C phase increase so that a crystal transition rate is slowed down to impede erasing. A lower proportion of In—C phase precludes growth of $ABC_2$ phase crystal grains to exacerbate repetitive overwrite capability. If d is beyond the range, excessive In would bond with B to form an In—B phase which reduces the reflectance of an unrecorded portion, resulting in a low modulation factor. The In—B phase has a relatively high crystal transition rate and provides a nucleus upon crystallization so that the crystal transition rate of $ABC_2$ phase is too accelerated.

If e is below the range, a too fast crystal transition rate would result so that recording of long wavelength signals such as 11T signals at a slow linear velocity would result in low C/N and unacceptable repetitive overwrite capability. If e is beyond the range, a differential reflectance concomitant with a phase change would become too small to provide a modulation factor.

Element A is Ag and/or Au, preferably Ag. Preferably Ag occupies at least 50 atom %, more preferably at least 80 atom % of the entire A. Most preferably only Ag is used as element A. If the proportion of Au in the entire element A is too high, a crystal transition rate would be too fast to provide a satisfactory modulation factor and C/N at a low linear velocity of 1.2 to 2.8 m/s.

Element B is Sb and/or Bi, preferably Sb. Preferably Sb occupies at least 50 atom %, more preferably at least 80 atom % of the entire B. Most preferably only Sb is used as element B. If the proportion of Bi in the entire element B is too high, a recording layer would have an increased coefficient of absorption to reduce optical interference, resulting in a reduced reflectance difference between crystalline and amorphous states and hence, a low C/N.

Element C is Te and/or Se, preferably Te. Preferably Te occupies at least 50 atom %, more preferably at least 80 atom % of the entire C. Most preferably only Te is used as element C. If the proportion of Se in the entire element C is too high, a crystal transition rate would be too slow to provide a satisfactory erasing factor.

In addition to the above-mentioned recording material, the recording layer may contain a minor amount of impurities, for example, Cu, Ni, Zn, Fe, O, N and C. The total amount of these impurities should preferably be up to 0.05 atom %.

In one preferred embodiment, the recording layer is constructed as a mixture of the recording material and a dielectric material whereby the recording layer can have a very low reflectance in an amorphous or microcrystalline state, leading to an outstanding increase of modulation factor. This is because a recording layer of a recording material/dielectric material mixture prevents a lowering of light absorption when it is made thicker. In general recording materials have a refractive index n of about 4 to 6 (4 in an amorphous state and 6 in a crystalline state) and a coefficient of absorption k of about 2.2 to 3.3 (2.2 in an amorphous state and 3.3 in a crystalline state) while those dielectric materials having a relatively high refractive index n have n of about 1.8 to 2.5. The dielectric material is dispersed in the recording material. Such a mix recording layer has a gradually lowering refractive index n and a drastically lowering coefficient of absorption k with the mix proportion of dielectric material so that the light absorbance of the recording layer per unit thickness is remarkably reduced. This permits the recording layer to be increased in thickness whereby the phase difference effect of return light is enhanced to increase the reflectance difference between crystalline and microcrystalline or amorphous states, resulting in a fully increased modulation factor.

In the preferred embodiment wherein the recording layer contains a dielectric material as well as a recording material, the dielectric material is not critical and may be selected from various transparent ceramics including silicon oxide such as $SiO_2$, silicon nitride such as $Si_3N_4$, zinc sulfide such as ZnS, and mixtures thereof, and various species of glass. Also useful are so-called LaSiON materials containing La, Si, O and N, so-called SiAlON materials containing Si, Al, O and N, and yttrium-containing SiAlON materials. Preferred dielectric materials have an index of refraction of at least 1.4, especially at least 2 in the wavelength range of 400 to 850 nm. This wavelength range covers 780 nm which is the wavelength used in current CD players and 680 nm which is a candidate wavelength of the next generation recording technology and represents the range over which the optical recording medium of the invention is advantageously operated. Preferred examples of the dielectric material are a mixture of ZnS and $SiO_2$, a mixture of ZnS and $Si_3N_4$, and a mixture of ZnS and $Ta_2O_5$. Preferably the recording layer contains the recording material and the dielectric material such that the recording material is at least 50% by volume, especially 60 to 80% by volume of the recording material and the dielectric material combined. When the proportion of the recording material is less than 100%, the tendency that the recording layer can have an increased coefficient of absorption to prohibit the recording layer from increasing its thickness and the interference effect becomes too low to provide modulation is avoided. If the proportion of the recording material is less than 50% by volume, the recording layer would have a low coefficient of absorption, a reduced reflectance change concomitant with a phase change, and a low modulation factor.

While the recording material generally has a coefficient of absorption k of about 3.3 in crystalline state and about 2.2 in microcrystalline or amorphous state as mentioned above, a recording layer of a recording material/dielectric material mixture=3/1 in volume ratio would have a reduced coefficient of absorption of about 1.2 in crystalline state and about 0.6 in microcrystalline or amorphous state.

The recording layer preferably has a thickness of about 100 to 500 Å, especially about 150 to 300 Å. If the recording layer is too thin, the growth of a crystalline phase would be retarded and a reflectance change concomitant with a phase change would become insufficient. If the recording layer is too thick, much A would diffuse through the recording layer in a direction perpendicular to its surface and less A would diffuse through the recording layer in a direction parallel to its surface (or in-plane direction) upon formation of a recorded mark. It is then less likely that the differential A concentration in the in-plane direction of the recording layer falls within the range of the invention.

The recording layer may be formed by any desired method, for example, sputtering and evaporation. A recording layer containing both a recording material and a dielectric material is preferably formed by a multiple source sputtering technique using a plurality of targets, typically a target of recording material and a target of dielectric material. With these targets disposed to face a substrate, sputtering is carried out while rotating the substrate relative to the targets. The rotational speed of the substrate relative to the targets preferably ranges from 1 to 10 rpm. A slower speed would fail to achieve uniform dispersion of both the materials in the layer whereas a faster speed would provide a high degree of dispersion to inhibit crystal growth upon crystallization. Alternatively, a composite target containing both recording and dielectric materials may be used. The recording layer formed by sputtering is generally believed as having a structure wherein particles of the dielectric material are dispersed in the recording material.

Referring to FIG. 1, there is illustrated one preferred configuration of the optical recording medium according to the present invention. The optical recording medium 1 has a lower dielectric layer 3, a recording layer 4, an upper dielectric layer 5, a reflective layer 6, and a protective layer 7 on a substrate 2.

Since the optical recording medium is adapted to be recorded and reproduced by directing a light beam to the recording layer 4 through the substrate 2, the substrate 2 is preferably formed of a material substantially transparent to such a light beam, for example, resins and glass. For ease of handling and low cost, resins are preferred substrate materials. A choice may be made among various resins such as acrylic resins, polycarbonate, epoxy resins and polyolefins. The shape and dimensions of the substrate are not critical although it is generally of disk shape having a diameter of about 50 to 360 mm and a thickness of about 0.5 to 3 mm. The substrate surface may be provided with a predetermined pattern of grooves for tracking and addressing purposes.

The differential A concentration to be established herein is in the direction of a recording track although element A also diffuses in a direction perpendicular to the track direction within a recording layer plane during recording. Where the substrate is grooved, the preferred grooves have a depth of 200 to 1,000 Å, more preferably 300 to 600 Å and a width of 0.8 to 1.8 μm, more preferably 1.0 to 1.6 μm because within these ranges, the differential A concentration can be established with ease. Note that the preferred groove dimensions depend on the recording wavelength. The above-described ranges are assigned to the recording wavelength of 780 nm. For a recording wavelength λ, the preferred range is given by multiplying the described value by λ780.

The lower dielectric layer 3 plays the role of preventing oxidation of the recording layer 4 and protecting the substrate by shutting off the heat which can otherwise conduct from the recording layer to the substrate upon recording. The upper dielectric layer 5 plays the role of protecting the recording layer and help the heat remaining in the recording layer after completion of recording release through heat transfer. The lower and upper dielectric layers 3 and 5 are made of any desired dielectric material, for example, selected from those exemplified for the dielectric material contained in the recording layer, preferably those having a relatively high index of refraction. The lower dielectric layer 3 is preferably about 500 to 3,000 Å thick, more preferably 1,000 to 2,500 Å thick. Within this thickness range, the lower dielectric layer is effective for preventing any damage to the substrate upon recording and higher modulation is available. The upper dielectric layer 5 is preferably about 100 to 300 Å, more preferably about 150 to 200 Å thick. This thickness range ensures a fast cooling rate and thus permits to define a recorded mark with a clear edge, resulting in reduced jitter. Also higher modulation is available.

Each of the upper and lower dielectric layers 3 and 5 may be formed of two or more dielectric laminae of different compositions as will be described later.

The dielectric layers are preferably formed by gas phase growth methods such as sputtering and evaporation.

The reflective layer 6 may be formed of any desired material, typically high reflectivity metals, for example, Al, Au, Ag, Pt, and Cu alone or alloys containing at least one of these metals. The reflecting layer is preferably about 300 to 1,500 Å thick. Reflectivity would be short with a thickness below this range. A thickness beyond this range would provide no further improvement in reflectivity and add to the cost. The reflecting layer is preferably formed by gas phase growth methods such as sputtering and evaporation.

The protective layer 7 is provided for improving scratch resistance and corrosion resistance. Preferably the protective layer is formed of organic materials, typically radiation curable compounds or compositions thereof which are cured with radiation such as electron and UV radiation. The protective layer is generally about 0.1 to 100 μm thick and may be formed by conventional techniques such as spin coating, gravure coating, spray coating, and dipping.

In another preferred embodiment of the invention wherein the optical recording medium has a sufficiently high reflectivity to carry out reproduction in accordance with the CD standard, the lower dielectric layer includes at least one laminate consisting of two dielectric laminae having different indexes of refraction. The dielectric lamina having a higher index of refraction in the laminate is disposed adjacent to the substrate.

Figure 2:
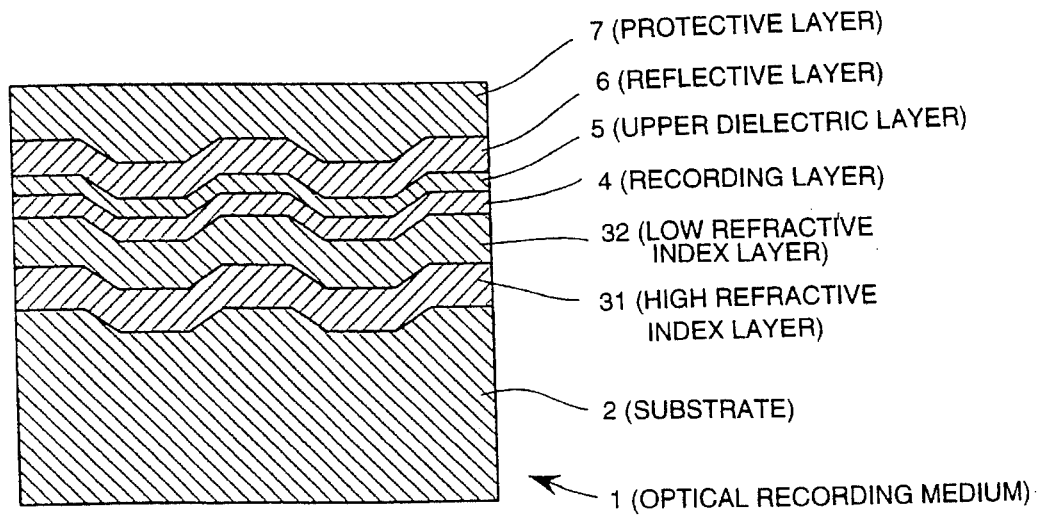
FIG. 2 is a fragmental cross-sectional view of another exemplary optical recording medium used in the invention.

FIG. 2 shows one preferred configuration for this embodiment. The optical recording medium 1 is shown as having a high index of refraction dielectric layer 31, a low index of refraction dielectric layer 32, a recording layer 4, an upper dielectric layer 5, a reflective layer 6, and a protective layer 7 on a substrate 2. In this configuration, the high index of refraction dielectric layer 31 and low index of refraction dielectric layer 32 constitutes the laminate.

The dielectric material of which the high index of refraction layer 31 is made should preferably have a relatively high index of refraction like the dielectric material to be contained in the recording layer, typically an index of refraction of at least 2 as measured at a wavelength of 400 to 850 nm. The dielectric material of which the low index of refraction layer 32 is made should preferably have a relatively low index of refraction, typically an index of refraction of less than 2 as measured at a wavelength of 400 to 850 nm. Useful dielectric materials having a low refractive index include $SiO_2$, $MgF_2$, $CaF_2$, $LiF_2$ and mixtures thereof. It will be understood that reflectivity is further improved by providing more than one such laminate. In practice, however, one or two laminates are preferred because a larger number of laminates reduce modulation.

Preferably, the high index of refraction layer 31 is about 500 to 1,500 Å thick and the low index of refraction layer 32 is about 300 to 1,500 Å. Where two laminates are provided, the laminate on the substrate side includes a high index of refraction layer of about 750 to 900 Å thick, more preferably 800 to 850 Å thick and a low index of refraction layer of about 400 to 500 Å thick, and the other laminate on the recording layer side includes a high index of refraction layer of about 750 to 900 Å thick, more preferably 800 to 850 Å thick and a low index of refraction layer of about 1,000 to 1,400 Å thick, more preferably 1,200 to 1,300 Å thick.

The substrate 2, recording layer 4, upper dielectric layer 5, reflective layer 6 and protective layer 7 are the same as those of FIG. 1. The recording layer is preferably about 150 to 500 Å thick when formed solely of a recording material and about 200 to 1,000 Å thick when formed of a mixture of recording and dielectric materials.

Described below is how to operate the optical recording medium of the invention for recording and reproduction.

In the optical recording medium of the invention, the recording layer has crystallized over the entire area in an initialized state. When a recording light beam, typically laser beam is directed to the recording layer in crystalline state to define a spot, the recording material is melted within the irradiated spot. After removal of the recording light beam, the temperature of the spot drops quickly so that the spot becomes substantially amorphous or microcrystalline to form a signal recorded spot or mark.

When it is desired to rewrite the recorded information, a recording light beam is directed to a spot of the recording layer where a signal is to be newly written while an erasing light beam is continuously directed to the remaining spots. The spots where the erasing light beam is irradiated are heated, but the temperature is relatively low and does not exceed the melting point of the recording material because the erasing light beam is of relatively low power as compared with the recording light beam. However, the erasing light beam is irradiated over a wide area, the resultant heat accumulation provides a gentle temperature gradient so that the cooling rate is slower than the crystal transition rate, allowing for crystallization. The record spot is once melted upon exposure to the recording light beam, but remains in the amorphous or microcrystalline state because the heat is quickly diffused toward the reflective layer. Accordingly, upon rewriting, whether the recording material is crystalline or amorphous (or microcrystalline) before irradiation, those portions irradiated with the recording light beam all become amorphous (or microcrystalline) and those portions irradiated with the erasing light beam all become crystalline. Overwrite recording is done in this way. Such overwrite recording can be carried out by using a single light beam which is modulated into recording and erasing light beams.

Preferably the recording light beam is emitted in pulses. By recording a single signal with two or more pulses of irradiation, the heat accumulation at the record mark is minimized and the swelling of a trailing edge of the record mark known as a teardrop phenomenon is minimized, resulting in improved C/N. The pulse irradiation also provides an increased erasing coefficient.

It is to be noted that the same as above applies for the transition of the recording material caused by light beam irradiation where the recording layer contains a dielectric material.

The power Pw of the recording light beam and the power Pe of the erasing light beam may be empirically determined. Preferred ranges of Pw and Pe are as follows. In the configuration of FIG. 1 wherein the recording layer is formed of a recording material alone or a mixture of recording and dielectric materials, Pw is at least 12 mW and Pe is 4 to 9 mW. In the configuration of FIG. 2 wherein the recording layer is formed of a recording material alone, Pw is at least 30 mW and Pe is 18 to 25 mW. In the configuration of FIG. 2 wherein the recording layer contains a dielectric material, Pw is at least 30 mW and Pe is at least 20 mW. The reading light beam should be of a low power which does not affect the crystallographic state of the recording layer. Understandably the signal recorded marks in amorphous or microcrystalline state give lower reflectance than the unrecorded portions in crystalline state.

Preferably the optical recording medium of the invention is operated by rotating it to provide a relative speed of the recording layer relative to the recording light beam of about 1.0 to 6.0 m/s, especially 1.2 to 5.2 m/s. At a higher relative speed, the recording layer is cooled at a too high rate upon recording to allow for sufficient diffusion of element A, failing to provide the above specified differential A concentration.

EXAMPLE

Examples of the present invention are given below by way of illustration and not by way of limitation.

A disk-shaped substrate 2 was injection molded from polycarbonate to a diameter of 133 mm and a thickness of 1.2 mm while grooves were simultaneously formed on one major surface thereof. On the grooved surface of the substrate 2, a lower dielectric layer 3, a recording layer 4, an upper dielectric layer 5, a reflective layer 6 and a protective layer 7 were successively formed, fabricating an optical recording disk sample No. 1 of the configuration shown in FIG. 1. The grooves had a width of 0.6 μm, a depth of 400 Å, and a pitch of 1.6 μm.

The lower dielectric layer 3 was formed by sputtering ZnS and $SiO_2$ targets. The ratio of $SiO_2/(ZnS+SiO_2)$ was 15 mol %. The lower dielectric layer had an index of refraction of 2.33 at the wavelength of 780 nm and a thickness of 1,700 Å.

The recording layer 4 was formed by RF sputtering a target with a power of 2.2 W/cm². The target used was an antimony (Sb) target having chips of Ag, In, Te and V attached to the surface thereof. The recording layer was of the composition (atomic ratio):

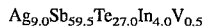

$Ag_{9.0}Sb_{59.5}Te_{27.0}In_{4.0}V_{0.5}$ as analyzed by inductively coupled plasma (ICP) spectrometry. The recording layer had a thickness of 170 Å.

The upper dielectric layer 5 was formed by the same procedure as the lower dielectric layer 3. The upper dielectric layer had a thickness of 170 Å.

The reflective layer 6 was formed to a thickness of 1,000 Å by sputtering an Au target. The protective layer 7 was formed by applying a UV curable resin by spin coating and exposing to UV radiation for curing. The protective layer was 5 μm thick at the end of curing.

Next, for initialization, laser light of 7.0 mW was irradiated to the amorphous recording layer, thereby causing the recording layer to crystallize.

While the disk sample No. 1 after initialization was rotated at a linear velocity of 2.8 m/s, the disk sample was recorded with signals (lit signals) having a frequency of 393 kHz and then reproduced for measuring the C/N of the reproduced signals. The recorded portion was measured for reflectance, from which a modulation factor was calculated as (unrecorded portion reflectance—recorded portion reflectance)/unrecorded portion reflectance. As a result, sample No. 1 had a C/N of 62 dB and a modulation factor of 72%.

Also while the disk sample No. 1 after initialization was rotated at a linear velocity of 2.8 m/s, overwriting of signals having a frequency of 1,440 kHz was carried out. An erasing coefficient was determined as C/N after recording minus C/N after erasing light beam irradiation. As a result, sample No. 1 had an erasing coefficient of 33 dB.

Additionally, while the disk sample No. 1 after initialization was rotated at a linear velocity of 2.8 m/s, signals having a frequency of 393 kHz were continuously recorded. The number of recording runs repeated until the C/N declined to 45 dB and the number of recording runs repeated until the modulation factor declined to 60% were determined. The repetitive recording ability was more than 50,000 runs when evaluated for C/N and more than 5,000 runs when evaluated for modulation factor.

In each of the measurements, the writing light beam had a power Pw of 14.0 mW because the C/N was not increased further when the writing light beam had a power Pw of about 12 mW. The erasing light beam had a power Pe of 6.0 mW. The reading light beam had a power Pr of 1.0 mW. All these light beams had the wavelength of 780 nm.

Next, the reflective layer was stripped from disk sample No. 1 in which signals had been recorded for C/N measurement. The sample was immersed in a hydrofluoric acid solution to dissolve away the upper and lower dielectric layers and only the recording layer was recovered from the hydrofluoric acid solution. This recording layer was analyzed by transmission electron microscopy, EPMA, and X-ray microanalysis for determining the structure and composition of a recorded mark and the structure and composition of an unrecorded portion disposed adjacent the recorded mark in the track direction. The recorded mark was amorphous and the crystalline unrecorded portion was a mixture of $AgSbTe_2$, Sb, and InTe phases. The recorded mark had a maximum Ag concentration of 7.0 atom % and the unrecorded portion had a maximum Ag concentration of 9.0 atom %, with the differential Ag concentration being 2.0 atom %. The recorded mark near at its center had the composition:

$$Ag_{7.0}Sb_{57.5}Te_{31.0}In_{4.0}V_{0.5}$$

which indicated that Ag was selectively decreased in the recorded mark.

Also disk sample No. 1 in which signals had been recorded for C/N measurement was stored for 500 hours in an environment of 80° C. and RH 80%. Thereafter, the sample was measured for C/N and modulation factor which remained unchanged from before the storage. As in the above analysis, only the recording layer was recovered from the sample and analyzed by transmission electron microscopy to find no change in the amorphous phase of the recorded mark.

Comparison in terms of linear velocity

Sample No. 1 was operated at a linear velocity of 7m/s for recording while the recording ability and differential Ag concentration were measured. It had a C/N of 62 dB and a modulation factor of 76%. As compared with the results at a slow linear velocity, the C/N was equal and the modulation factor was somewhat higher. But the erasing coefficient markedly decreased to 21 dB. Accordingly the repetitive recording ability declined seriously as demonstrated by 200 runs for C/N and 100 runs for modulation factor. The differential Ag concentration was 0.4 atom % or outside the scope of the invention. After 80° C/RH 80% storage for 500 hours, the sample had a C/N dropped to 37 dB and a modulation factor dropped to 51%. After the storage, the amorphous phase of the recorded mark partially crystallized with precipitation of $AgSbTe_2$ and InTe phases observed.

Comparison in terms of recording layer thickness

An optical recording disk sample No. 2 was fabricated by the same procedure as No. 1 except that the recording layer had a thickness of 1,000 Å. Sample No. 2 was similarly measured and analyzed. The recording linear velocity was 2.8 m/s. Sample No. 2 had a C/N of 58 dB and a modulation factor of 68%, which were lower than sample No. 1 having a thinner recording layer. The repetitive recording ability was 150 runs for C/N and 80 runs for modulation factor, indicating a marked decline of repetitive performance. The differential Ag concentration was 0.3 atom % or outside the scope of the invention. After 80° C/RH 80% storage for 500 hours, the sample had a C/N dropped to 33 dB and a modulation factor dropped to 44%. After the storage, the amorphous phase of the recorded mark partially crystallized.

Comparison in terms of recording layer's Ag content

An optical recording disk sample No. 3 was fabricated by the same procedure as No. 1 except that the recording layer had the following composition.

$$Ag_{15.0}Sb_{52.5}Te_{28.0}In_{4.0}V_{0.5}$$

Sample No. 3 was similarly measured and analyzed. The recording linear velocity was 2.8 m/s. Sample No. 3 had a C/N of 60 dB and a modulation factor of 69%, which were lower than sample No. 1 having a lower recording layer Ag content. The repetitive recording ability was 20,000 runs for C/N and 3,000 runs for modulation factor, indicating a decline of repetitive performance. The differential Ag concentration was 0.3 atom % or outside the scope of the invention. After 80° C./RH 80% storage for 500 hours, the sample had a C/N dropped to 39 dB and a modulation factor dropped to 51%. After the storage, the amorphous phase of the recorded mark partially crystallized.

Equivalent results were obtained when at least part of Sb in the recording layer was replaced by Bi in each of the foregoing samples. However, when the Bi replacement exceeded 80 atom % of the Sb, the recording layer had an increased coefficient of absorption so that an optically possible differential reflectance between crystalline and amorphous states was reduced, resulting in a reduced modulation factor.

Equivalent results were obtained when at least part of V in the recording layer was replaced by Ti in each of the foregoing samples. Also equivalent results were obtained when at least part of V in the recording layer was replaced by Zr, Hf, Nb, Ta, Mn, W, Mo or a mixture thereof in each of the foregoing samples. When at least part of Ag in the recording layer was replaced by Au in each of the foregoing samples, a crystallization rate was slightly accelerated as compared with the sole use of Ag. Equivalent results to the sole use of Ag were achieved by increasing the amount of V added.

When V was eliminated from the recording layer in each of the foregoing samples, there occurred a little drops of C/N and modulation factor both before and after storage. However, the tendency that recording properties and reliability depend on a differential Ag concentration was the same.

The advantages of the invention are evident from the results of the foregoing samples.

Japanese Patent Application No. 87854/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical recording medium having a recording layer for recording information by directing a light beam to the recording layer to form recorded marks therein and comprising:

said recording layer comprising a recording material containing elements A, B and C, wherein 1) A is at least one of silver and gold and containing at least 50 atom % of silver 2), B is at least one of antimony and bismuth and containing at least 50 atom % of antimony 3), and C is at least one of tellurium and selenium and containing at least 50 atom % of tellurium;

the recorded marks are at least one of being amorphous and microcrystalline and an unrecorded portion of said recording layer remains crystalline; and a differential A concentration given by the A concentration of the unrecorded portion minus the A concentration of the recorded marks is at least 0.5 atom % and up to 5 atom %, and the recording layer is 100 to 500 Å thick.

2. The optical recording medium of claim 1, wherein the recording material contains 3.0 to 28 atom % of element A.

3. The optical recording medium of claim 1, wherein the unrecorded portion contains an $ABC_2$ phase.

4. The optical recording medium of claim 3, wherein the recording material further contains indium and the unrecorded portion contains and In—C phase.

5. The optical recording medium of claim 1, wherein the unrecorded portion further contains a B phase.

6. The optical recording medium of claim 1, wherein the recording material further contains indium and the unrecorded portion contains an In—C phase.

7. The optical recording medium of claim 6, wherein the recording material is represented by the formula:

$$A_a B_b C_c In_d M_e$$

wherein A, B, C and M are as defined above and letters a, b, c, d, and e are representative of an atomic ratio and are in the range:
$3.0 \leq a \leq 13.0$
$45.0 \leq b \leq 87.0$
$8.0 \leq c \leq 34.0$
$2.0 \leq d \leq 8.0$
$0 \leq e \leq 5.0$, and
$a+b+c+d+e=100$.

8. The optical recording medium of claim 1, wherein the recording material is represented by the formula:

$$A_a B_b C_c In_d M_e$$

wherein A, B, C and M are as defined above and letters a, b, c, d, and e are representative of an atomic ratio and are in the range:
$3.0 \leq a \leq 13.0$
$45.0 \leq b \leq 87.0$
$8.0 \leq c \leq 34.0$
$2.0 \leq d \leq 8.0$
$0 \leq e \leq 5.0$, and
$a+b+c+d+e=100$.

9. A method for recording information in an optical recording medium having a recording layer comprising directing a light beam to the recording layer to form recorded marks therein, wherein
said recording layer is comprised of a recording material containing elements A, B and C wherein 1) A is at least one of silver and gold and containing at least 50 atom % of silver 2), B is at least one of antimony and bismuth and containing at least 50 atom % of antimony 3), and C is at least one of tellurium and selenium and containing at least 50 atom % of tellurium,
recording is effected such that the recorded marks are amorphous or microcrystalline while an unrecorded portion of said recording layer remains crystalline, and a differential A concentration given by the A concentration of the unrecorded portion minus the A concentration of the recorded marks is at least 0.5 atom % and up to 5 atom % and
the recording layer is 100 to 500 Å thick.

10. The optical recording method of claim 9 wherein the recording material contains 3.0 to 28 atom % of element A.

11. The optical recording method of claim 9 wherein the medium is operated such that the recording layer may have a linear velocity of 1.0 to 6.0 m/s relative to the light beam.

12. The optical recording method of claim 1 wherein the unrecorded portion contains an $ABC_2$ phase.

13. The optical recording method of claim 12 wherein the unrecorded portion further contains a B phase.

14. The optical recording method of claims 12, wherein the recording material further contains indium and the unrecorded portion contains an In—C phase.

15. The optical recording method of claim 9 wherein the recording material further contains indium and the unrecorded portion contains an In—C phase.

16. The optical recording method of claim 9 wherein the recording material further contains at least one element M selected from the group consisting of Ti, Zr, Hf, V, Nb, Ta, Mn, W, and Mo.

17. The optical recording method of claim 16, wherein the recording material is represented by the formula:

$$A_a B_b C_c In_d M_e$$

wherein A, B, C and M are as defined above and letters a, b, c, d, and e are representative of an atomic ratio and are in the range:
$3.0 \leq a \leq 13.0$
$45.0 \leq b \leq 87.0$
$8.0 \leq c \leq 34.0$
$2.0 \leq d \leq 8.0$
$0 \leq e \leq 5.0$, and
$a+b+c+d+e=100$.

18. The optical recording method of claim 9 wherein the recording material is represented by the formula:

$$A_a B_b C_c In_d M_e$$

wherein A, B, C and M are as defined above and letters a, b, c, d, and e representative of an atomic ratio are in the range:
$3.0 \leq a \leq 13.0$,
$45.0 \leq b \leq 87.0$,
$8.0 \leq c \leq 34.0$,
$2.0 \leq d \leq 8.0$,
$0 \leq e \leq 5.0$, and
$a+b+c+d+e=100$.

* * * * *

UNITED STATES PATENT AND TRADEMARK OFFICE
CERTIFICATE OF CORRECTION

PATENT NO. : 5,523,140
DATED : June 4, 1996
INVENTOR(S) : Junji Tominaga, et al

It is certified that error appears in the above-indentified patent and that said Letters Patent is hereby corrected as shown below:

Column 14, lines 51 and 52 should read:

--% of silver, 2) B is at least one of antimony and bismuth and containing at least 50 atom % of antimony and 3)--

Column 15, lines 44 and 45 should read:

--% of silver, 2) B is at least one of antimony and bismuth and containing at least 50 atom % of antimony and 3)--

Signed and Sealed this

Twentieth Day of August, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,523,140
DATED : Jun. 4, 1996
INVENTOR(S) : Junji Tominaga, et al

It is certified that error appears in the above-indentified patent and that said Letters Patent is hereby corrected as shown below:

Column 15, line 3 should read:

--corded portion contains an In-C phase.--

Column 16, line 13 should read:

--The optical recording method of claim 12, wherein--

Signed and Sealed this

Third Day of December, 1996

Attest:

BRUCE LEHMAN

Attesting Officer

Commissioner of Patents and Trademarks